(12) United States Patent
Steere et al.

(10) Patent No.: US 7,136,501 B2
(45) Date of Patent: Nov. 14, 2006

(54) ACOUSTICALLY ENHANCED ELECTRO-DYNAMIC LOUDSPEAKERS

(75) Inventors: John F Steere, Martinsville, IN (US); David B. Garner, Indianapolis, IN (US); Steven W Hutt, Bloomington, IN (US)

(73) Assignee: Harman International Industries, Incorporated, Northridge, CA (US)

( * ) Notice: Subject to any disclaimer, the term of this patent is extended or adjusted under 35 U.S.C. 154(b) by 0 days.

(21) Appl. No.: 11/039,494

(22) Filed: Jan. 19, 2005

(65) Prior Publication Data

US 2005/0135653 A1 Jun. 23, 2005

Related U.S. Application Data

(62) Division of application No. 10/429,289, filed on May 2, 2003.

(60) Provisional application No. 60/391,134, filed on Jun. 24, 2002, provisional application No. 60/378,188, filed on May 6, 2002, provisional application No. 60/380,001, filed on May 2, 2002.

(51) Int. Cl.
*H04R 7/06* (2006.01)
*H04R 1/02* (2006.01)
*H04R 7/16* (2006.01)

(52) U.S. Cl. .................. 381/399; 381/190; 381/408; 381/423

(58) Field of Classification Search ............. 381/152, 381/176, 184, 190, 359, 401, 407, 408, 409, 381/417, 423, 426, 431; 181/155, 164, 157, 181/170

See application file for complete search history.

(56) References Cited

U.S. PATENT DOCUMENTS

| | | | |
|---|---|---|---|
| 3,570,626 A | 3/1971 | Mochida et al. | 181/164 |
| 4,156,801 A | 5/1979 | Whelan et al. | |
| 4,242,541 A * | 12/1980 | Ando | 381/190 |
| 4,264,789 A * | 4/1981 | Kaizu et al. | 381/408 |
| 4,281,223 A * | 7/1981 | Ugaji et al. | 381/408 |
| 4,544,805 A | 10/1985 | Sawafuji | |
| 5,850,461 A | 12/1998 | Zelinka | |
| 6,154,557 A | 11/2000 | Montour et al. | 381/431 |
| 6,546,106 B1 | 4/2003 | Azima | 381/152 |
| 6,845,166 B1 * | 1/2005 | Hara et al. | 381/399 |
| 2001/0005419 A1 | 6/2001 | Kermani et al. | |
| 2002/0191808 A1 | 12/2002 | Croft, III et al. | |

FOREIGN PATENT DOCUMENTS

FR 2 765 767 1/1999

OTHER PUBLICATIONS

Furihata et al., "Acoustic characteristics of an electrodynamic planar digital loudspeaker." J Acoustical Society of America 114(1):174-184, Jul. 2003.

* cited by examiner

*Primary Examiner*—Sinh Tran
*Assistant Examiner*—Brian Ensey
(74) *Attorney, Agent, or Firm*—Pauley Petersen & Erickson

(57) ABSTRACT

An electro-dynamic loudspeaker is provided with dampening arrangements that contribute to improved acoustical properties for the electro-dynamic planar loudspeaker. The dampening arrangements include providing a frame having a curved sidewall surface for reducing standing waves. Another design provides for a ferrofluid being disposed between the diaphragm and magnets of the electro-dynamic loudspeaker in order to dampen the resonance frequency of the device. In addition, a diaphragm of an electro-dynamic loudspeaker is provided with a short turn of conductor disposed along a fringe zone at an edge of the diaphragm in order to electro-dynamically dampen the edge resonance of the film.

3 Claims, 8 Drawing Sheets

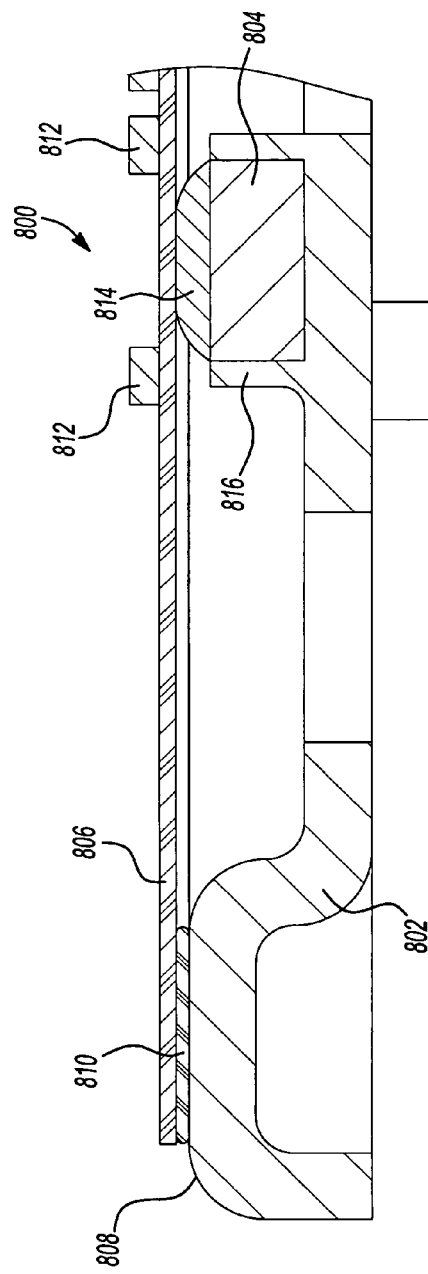
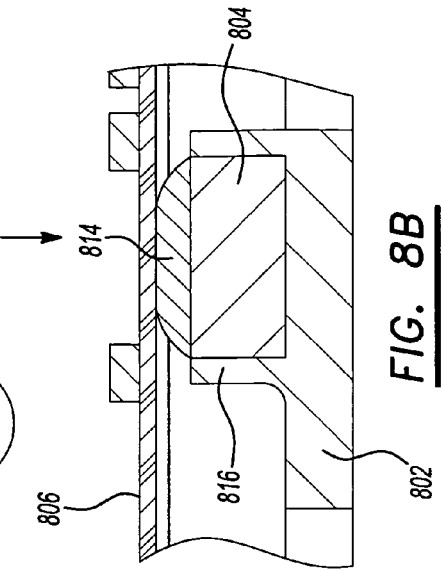
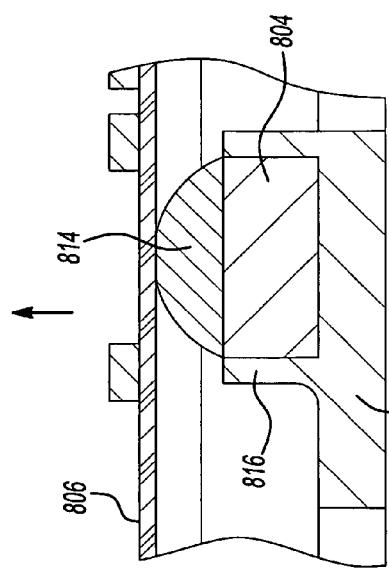
FIG. 8
FIG. 8A
FIG. 8B

ACOUSTICALLY ENHANCED ELECTRO-DYNAMIC LOUDSPEAKERS

REFERENCE TO RELATED APPLICATIONS

This application is a Divisional Application of U. S. patent application Ser. No. 10/429,289 filed on May 2, 2003 which claims the benefit of U.S. Provisional Application Nos. 60/380,001, filed May 2, 2002, 60/378,188, filed May 6, 2002, and 60/391,134, filed Jun. 24, 2002. These patent applications are incorporated by reference.

CROSS REFERENCE TO CO-PENDING APPLICATIONS

This application incorporates by reference the disclosures of each of the following co-pending applications which have been filed concurrently with the parent of this application: U.S. patent application Ser. No. 10/428,313, entitled "Mounting Bracket System," filed May 2, 2003; U.S. patent application Ser. No. 10/429,165, entitled "Film Tensioning System," filed May 2, 2003; U.S. patent application Ser. No. 10/428,316, entitled "Film Attaching System," filed May 2, 2003; U.S. patent application Ser. No. 10/429,228, entitled "Electrical Connectors For Electro-Dynamic Loudspeakers," filed May 2, 2003; U.S. patent application Ser. No. 10/428,314, entitled "Electro-Dynamic Loudspeaker Mounting System," filed May 2, 2003; U.S. patent application Ser. No. 10/429,173, entitled "Conductors For Electro-Dynamic Loudspeakers," filed May 2, 2003; U.S. patent application Ser. No. 10/429,164, entitled "Frame Structure," filed May 2, 2003; U.S. patent application Ser. No. 10/429,162, entitled "Directivity Control Of Electro-Dynamic Loudspeakers," filed May 2, 2003; U.S. patent application Ser. No. 10/429,243, entitled "Frequency Response Enhancements For Electro-Dynamic Loudspeakers," filed May 2, 2003; and U.S. patent application Ser. No. 10/429,163, entitled "Magnet Arrangement For Loudspeaker," filed May 2, 2003.

BACKGROUND OF THE INVENTION

1. Field of Invention

The invention relates to electro-dynamic loudspeakers, and more particularly, improvements for electro-dynamic loudspeakers and manufacturing methods thereof.

2. Related Art

The general construction of an electro-dynamic loudspeaker includes a diaphragm, in the form of a thin film, attached in tension to a frame. An electrical circuit, in the form of electrically conductive traces, is applied to the surface of the diaphragm. Magnetic sources, typically in the form of permanent magnets, are mounted adjacent to the diaphragm or within the frame, creating a magnetic field. When current is flowing in the electrical circuit, the diaphragm vibrates in response to the interaction between the current and the magnetic field. The vibration of the diaphragm produces the sound generated by the electro-dynamic loudspeaker.

Many design and manufacturing challenges present themselves in the manufacturing of electro-dynamic loudspeakers. First, the diaphragm, that is formed by a thin film, needs to be permanently attached, in tension, to the frame. Correct tension is required to optimize the resonance frequency of the diaphragm. Optimizing diaphragm resonance extends the bandwidth and reduces sound distortion of the loudspeaker.

The diaphragm is driven by the motive force created when current passes through the conductor applied to the diaphragm within the magnetic field. The conductor on the electro-dynamic loudspeaker is attached directly to the diaphragm. Because the conductor is placed directly onto the thin diaphragm, the conductor should be constructed of a material having a low mass and should also be securely attached to the film at high power (large current) and high temperatures.

Accordingly, designing conductors for electro-dynamic loudspeaker applications presents various challenges such as selecting the speaker with the desired audible output for a given location that will fit within the size and location constraints of the desired applications environment. Electro-dynamic loudspeakers exhibit a defined acoustical directivity pattern relative to each speaker's physical shape and the frequency of the audible output produced by each loudspeaker. Consequently, when an audio system is designed, loudspeakers possessing a desired directivity pattern over a given frequency range are selected to achieve the intended performance of the system. Different loudspeaker directivity patterns may be desirable for various loudspeaker applications. For example, for use in a consumer audio system for a home listening environment, a wide directivity may be preferred. In the application of a loudspeaker, a narrow directivity may be desirable to direct sound, e.g., voice, in a predetermined direction.

Often, space limitations in the listening environment prohibit the use of a loudspeaker in an audio system that possesses the preferred directivity pattern for the system's design. For example, the amount of space and the particular locations available in a listening environment for locating and/or mounting the loudspeakers of the audio system may prohibit the use of a particular loudspeaker that exhibits the intended directivity pattern. Also, due to space and location constraints, it may not be possible to position or oriented the desired loudspeaker in a manner consistent with the loudspeaker's directivity pattern. Consequently, size and space constraints of a particular environment may make it difficult to achieve the desired performance from the audio system. An example of a listening environment having such constraints is the interior passenger compartment of an automobile or other vehicle.

While the electric circuitry of electro-dynamic loudspeakers may present design challenges, electro-dynamic loudspeakers are very desirable loudspeakers because they are designed to have a very shallow depth. With this dimensional flexibility, electro-dynamic loudspeakers may be positioned at locations where conventional loudspeakers would not traditionally fit. This dimensional flexibility is particularly advantageous in automotive applications where positioning a loudspeaker at a location that a conventional loudspeaker would not otherwise fit could offer various advantages. Further, because the final loudspeaker assembly may be mounted on a vehicle, it is important that the assembly be rigid during shipping and handling so that the diaphragm or frame does not deform during installation.

While conventional electro-dynamic loudspeakers are shallow in depth and may therefore be preferred over conventional loudspeakers for use in environments requiring thin loudspeakers, electro-dynamic loudspeakers have a generally rectangular planar radiator that is generally relatively large in height and width to achieve acceptable operating wavelength sensitivity, power handling, maximum sound pressure level capability and low-frequency bandwidth. Unfortunately, the large rectangular size results in a high-frequency beam width angle or coverage that may be too narrow for its intended application. The high-frequency horizontal and vertical coverage of a rectangular planar radiator is directly related to its width and height in an inverse relationship. As such, large radiator dimensions exhibit narrow high-frequency coverage and vice versa.

The frame of the electro-dynamic loudspeakers supports the magnets, the diaphragm, and the terminal. A ferrous steel frame has the advantage of carrying magnetic flux that can improve efficiency over a non-ferrous frame. However, frames constructed from non-ferrous or non-metallic materials provide other manufacturing advantages. The frame presents design challenges since it is preferably rigid enough to keep the diaphragm film tension uniform and capable of not deforming during handling, assembly, or over time. The frame also should be capable of withstanding environmental high temperatures, humidity, salt, spray, etc., and be capable of bonding with the diaphragm film.

Other features affecting the acoustic characteristics of the electro-dynamic loudspeaker include damping of undriven portions of the diaphragm film in order to help reduce distortion and smooth frequency response. Damping is required to control film edges by reducing unproductive or counter productive vibration.

Furthermore, the controlled directivity of sound is critical for a good system design and acoustical interaction in the listening environment. The electro-dynamic loudspeakers exhibit defined acoustical directivity relative to frequency and to their shape and also relative to the distance from the source. In addition, other frequency response enhancements can also be made to the current electro-dynamic loudspeaker designs.

With the dimensional flexibility obtained with an electro-dynamic loudspeaker, various locations in automotive and non-automotive vehicles may be employed to house electro-dynamic loudspeakers. Different locations offer various advantages over other locations. The thin depth of the electro-dynamic loudspeaker allows them to fit where conventional loudspeakers would not. The final assembly may be mounted on a vehicle, and therefore, must be rigid during shipping and handling and should not allow the diaphragm or frame to deform during installation.

SUMMARY

The invention provides several arrangements and methods for enhancing the acoustical properties of an electro-dynamic loudspeaker. According to one aspect of the invention, the electro-dynamic loudspeaker includes a frame defining a recessed portion having a pair of sidewalls interconnected by a pair of endwalls and at least one of the sidewalls including a plurality of curves along a length of the sidewall. The curves can be in the form of a sinusoidal curve or scallops or another shape that is non-parallel to the opposing sidewall. The curves that are placed in at least one sidewall are provided in order to reduce standing waves that contribute to distortion.

The electro-dynamic loudspeaker includes a frame including a plurality of magnets mounted to the frame. A diaphragm is mounted to the frame and a ferrofluid is disposed between the diaphragm and the magnets and contacts a lower surface of the diaphragm. A ferrofluid is a stable colloidal suspension of sub-domain magnetic particles in a liquid carrier. The ferrofluid dampens the resonant frequency of the diaphragm in order to reduce distortion and smooth frequency response.

An electro-dynamic loudspeaker is provided with a shorted turn of conductor disposed along a fringe zone at an edge of the diaphragm. The shorted turn electro-dynamically dampens the edge resonance of the diaphragm.

A diaphragm of an electro-dynamic loudspeaker is made from a piezoelectric material, such as PVDF (polyvelydene-flouride) and is provided with a current carrying conductor and an undriven conductor applied to both sides of the film material. The undriven conductors are caused to move by the electromotive force on the circuit as the diaphragm vibrates, thus creating electric current through the undriven conductor. The electric current causes the piezoelectric material of the film to expand and contract in response to the electric current, and thereby dampens the film modes to reduce distortion and smooth frequency response. As an alternative, a PVDF strip can also be glued to a PEN (polyethylene naphthalate) film.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 8 is a cross-sectional view illustrating a ferrofluid disposed on a surface of a magnet and in contact with the film.

FIG. 8A is a detailed cross-sectional view of the ferrofluid on the magnet with the diaphragm in an upward direction.

FIG. 8B is a detailed cross-sectional view of the ferrofluid on the magnet with the diaphragm in a downward direction.

DETAILED DESCRIPTION

Figure 1:
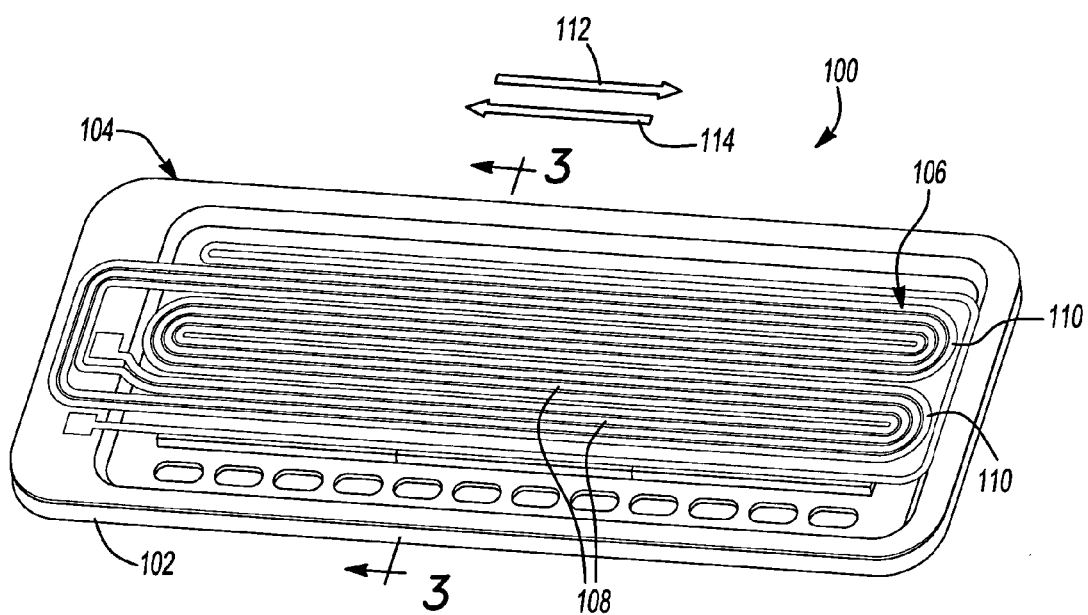
FIG. 1 is a perspective view of a electro-dynamic loudspeaker as it would appear with the grille removed.

FIG. 1 is a perspective view of an electro-dynamic loudspeaker 100 of the invention. As shown in FIG. 1, the electro-dynamic loudspeaker is a generally planar loudspeaker having a frame 102 with a diaphragm 104 attached in tension to the frame 102. A conductor 106 is positioned on the diaphragm 104. The conductor 106 is shaped in serpentine fashion having a plurality of substantially linear sections (or traces) 108 longitudinally extending along the diaphragm interconnected by radii 110 to form a single current path. Permanent magnets 202 (shown in FIG. 2) are positioned on the frame 102 underneath the diaphragm 104, creating a magnetic field.

Linear sections 108 are positioned within the flux fields generated by permanent magnets 202. The linear sections 108 carry current in a first direction 112 and are positioned within magnetic flux fields having similar directional polarization. Linear sections 108 of conductor 106 having current flowing in a second direction 114, that is opposite the first direction 112, are placed within magnetic flux fields having an opposite directional polarization. Positioning the linear sections 108 in this manner assures that a driving force is generated by the interaction between the magnetic fields developed by magnets 202 and the magnetic fields developed by current flowing in conductor 106. As such, an electrical input signal traveling through the conductor 106 causes the diaphragm 104 to move, thereby producing an acoustical output.

Figure 2:
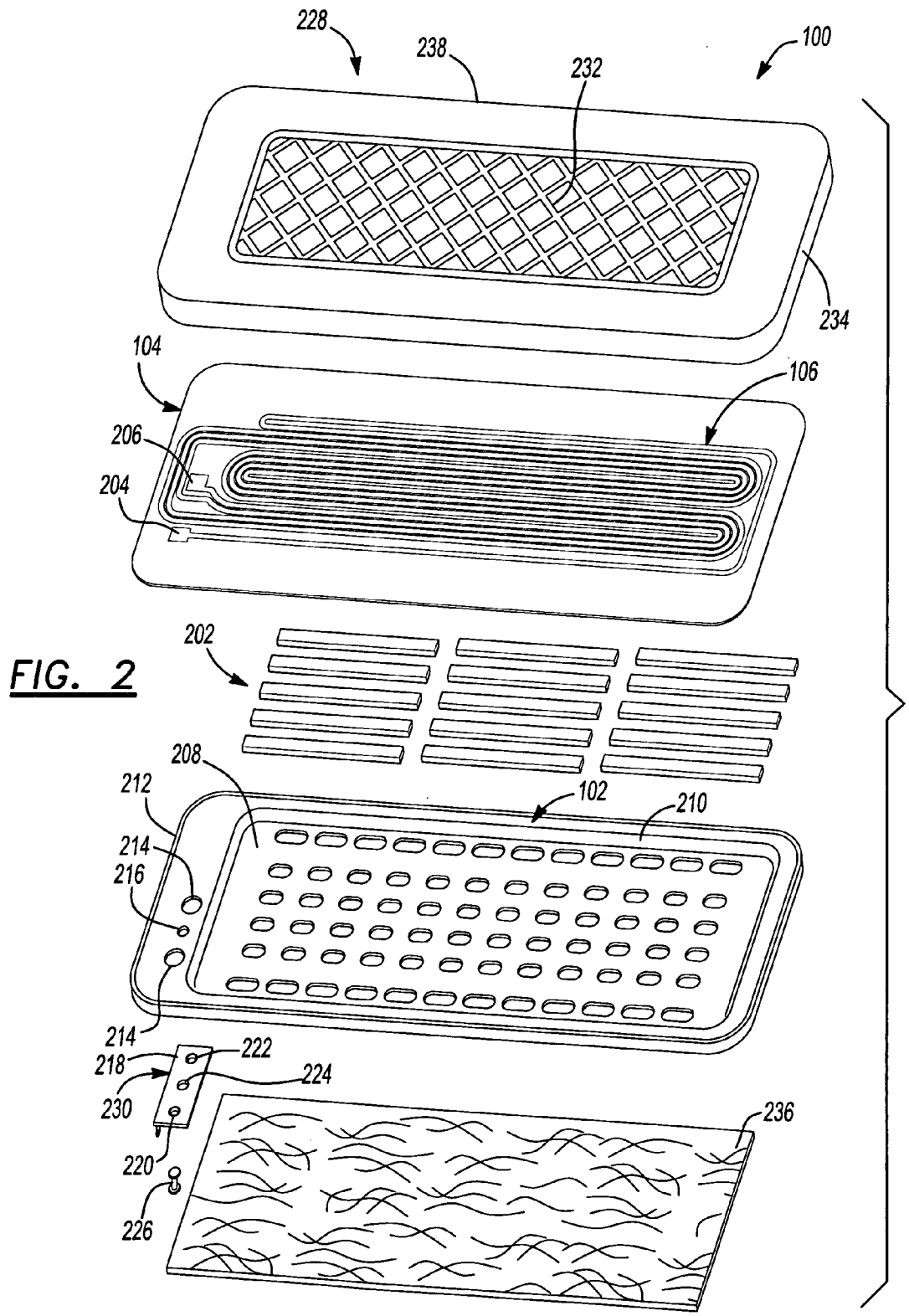
FIG. 2 is an exploded perspective view of the electro-dynamic loudspeaker shown in FIG. 1 having a grille.

FIG. 2 is an exploded perspective view of the electro-dynamic loudspeaker 100 shown in FIG. 1. As illustrated in FIG. 2, the flat panel loudspeaker 100 includes a frame 102, a plurality of high energy magnets 202, a diaphragm 104, an acoustical dampener 236 and a grille 228. Frame 102 provides a structure for fixing magnets 202 in a predetermined relationship to one another. In the depicted embodiment, magnets 202 are positioned to define five rows of magnets 202 with three magnets 202 in each row. The rows are arranged with alternating polarity such that fields of magnetic flux are created between each row. Once the flux fields have been defined, diaphragm 104 is fixed to frame 102 along its periphery.

A conductor 106 is coupled to the diaphragm 104. The conductor 106 is generally formed as an aluminum foil bonded to the diaphragm 104. The conductor 106 can, however, be formed from other conductive materials. The conductor 106 has a first end 204 and a second end 206 positioned adjacent to one another at one end of the diaphragm 104.

As shown in FIG. 2, frame 102 is a generally dish-shaped member preferably constructed from a substantially planar contiguous steel sheet. The frame 102 includes a base plate 208 surrounded by a wall 210. The wall 210 terminates at a radially extending flange 212. The frame 102 further includes apertures 214 and 216 extending through flange 212 to provide clearance and mounting provisions for a conductor assembly 230.

Conductor assembly 230 includes a terminal board 218, a first terminal 220 and a second terminal 222. Terminal board 218 includes a mounting aperture 224 and is preferably constructed from an electrically insulating material such as plastic, fiberglass or other insulating material. A pair of rivets or other connectors (not shown) pass through apertures 214 and 216 to electrically couple first terminal 220 to first end 204 and second terminal 222 to second end 206 of conductor 106. A fastener such as a rivet 226 extends through apertures 224 and 216 to couple conductor assembly 230 to frame 102.

A grille 228 functions to protect diaphragm 104 from contact with objects inside the listening environment while also providing a method for mounting loudspeaker 100. The grille 228 has a substantially planar body 238 having a plurality of apertures 232 extending through the central portion of the planar body 238. A rim 234 extends downward, substantially orthogonally from body 238, along its perimeter and is designed to engage the frame 102 to couple the grille 228 to the frame 102.

An acoustical dampener 236 is mounted on the underside of the base plate 208 of the frame 102. Dampener 236 serves to dissipate acoustical energy generated by diaphragm 104 thereby minimizing undesirable amplitude peaks during operation. The dampener 236 may be made of felt, or a similar gas permeable material.

Figure 3:
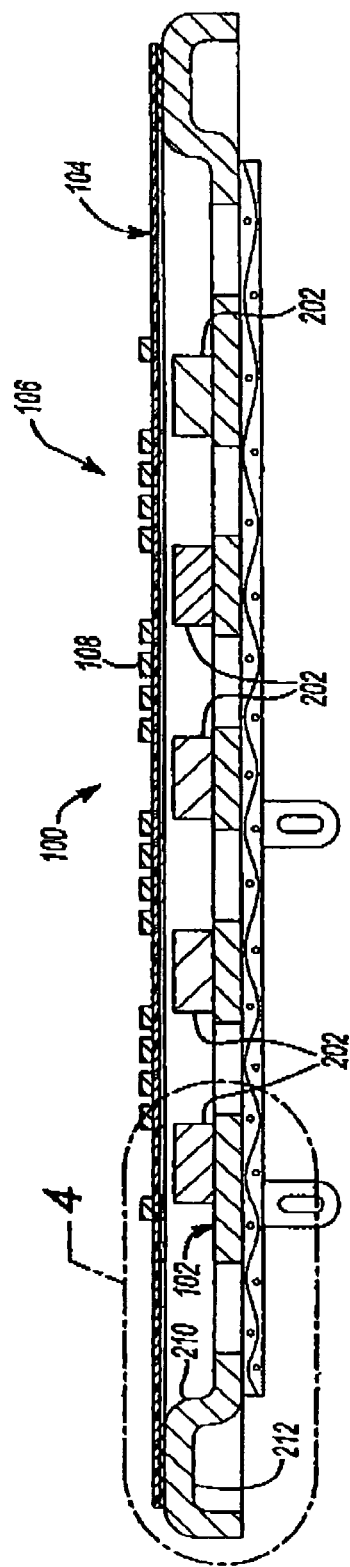
FIG. 3 is a cross-sectional view of the electro-dynamic loudspeaker taken along line 3—3 of FIG. 1.

FIG. 3 is a cross-sectional view of the electro-dynamic loudspeaker taken along line 3—3 of FIG. 1. FIG. 3 shows the frame 102 having the diaphragm 104 attached in tension to the frame 102 and the permanent magnets 202 positioned on the frame 102 underneath the diaphragm 104. Linear sections 108 of the conductor 106 are also shown positioned on top of the diaphragm 104.

Figure 4:
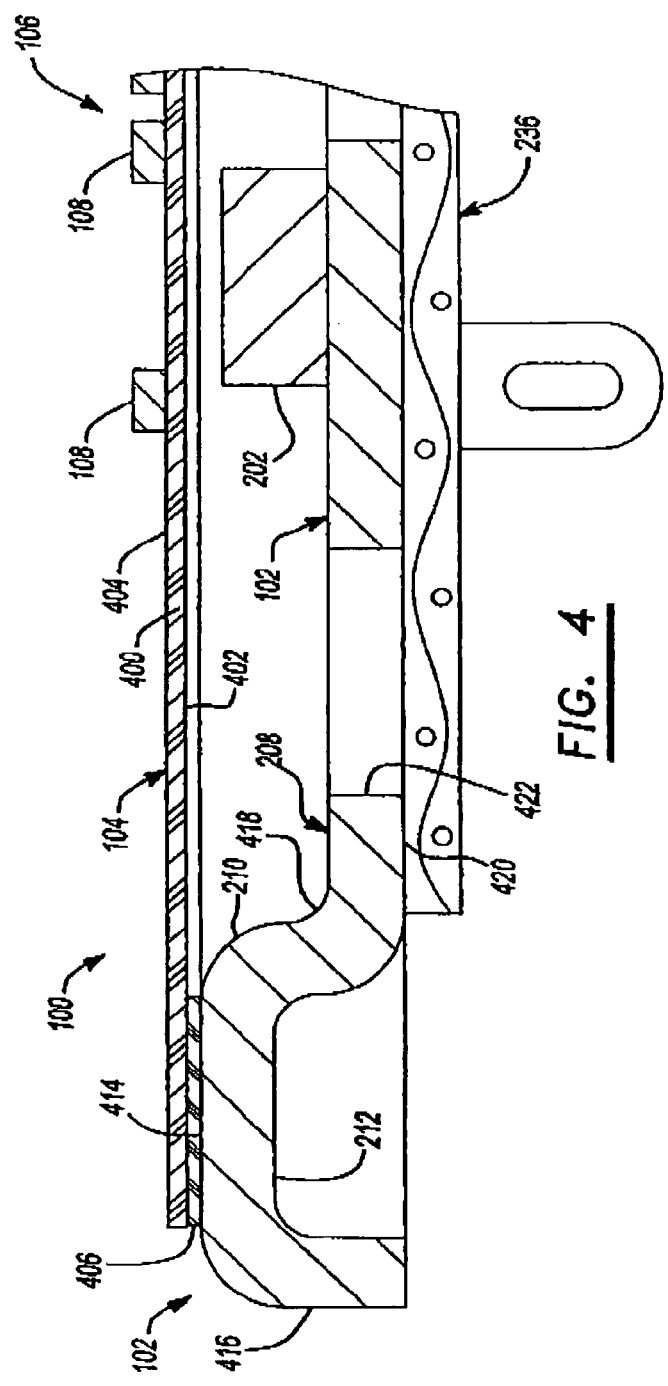
FIG. 4 is an enlarged cross-sectional view of the encircled area of FIG. 3.
Figure 5:
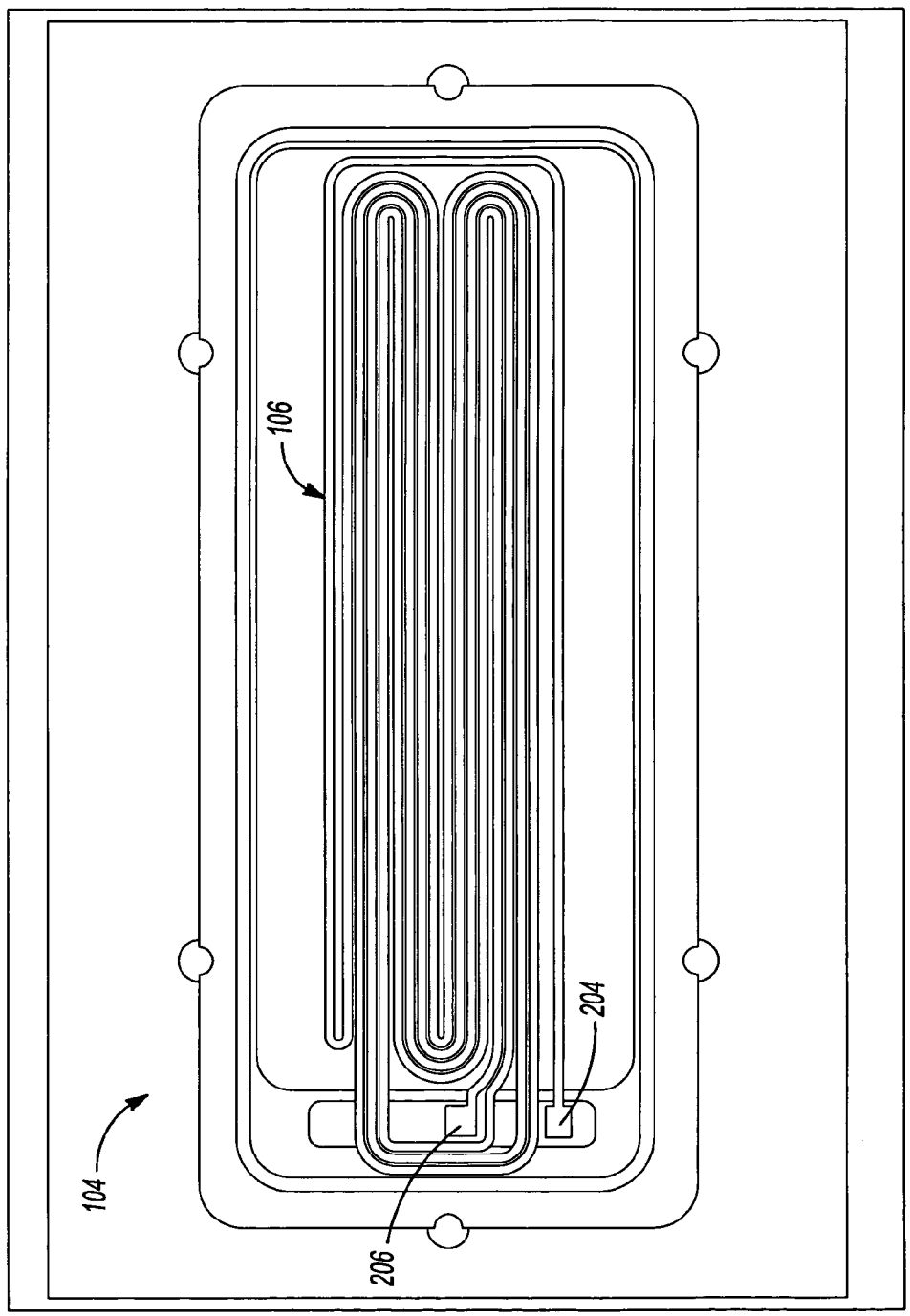
FIG. 5 is a plan view of the film having an attached conductor.

FIG. 4 is an enlarged cross-sectional view of the encircled area of FIG. 3. As illustrated by FIG. 4, the diaphragm 104 is comprised of a thin film 400 having a first side 402 and a second side 404. First side 402 is coupled to frame 102. Generally, the diaphragm 104 is secured to the frame 102 by an adhesive 406 that is curable by exposure to radiation. However, the diaphragm 104 may secured to the frame 102 by other mechanism, such as those known in the art.

To provide a movable membrane capable of producing sound, the diaphragm 104 is mounted to the frame 102 in a state of tension and spaced apart a predetermined distance from magnets 202. The magnitude of tension of the diaphragm 104 depends on the speaker's physical dimensions, materials used to construct the diaphragm 104 and the strength of the magnetic field generated by magnets 202. Magnets 202 are generally constructed from a highly energizable material such as neodymium iron boron (NdFeB), but may be made of other magnetic materials. The thin diaphragm film 400 is generally a polyethylenenaphthalate sheet having a thickness of approximately 0.001 inches; however, the diaphragm film 400 may be formed from materials such as polyester (e.g., known by the tradename "Mylar"), polyamide (e.g., known by the tradename "Kapton") and polycarbonate (e.g., known by the tradename "Lexan"), and other materials known by those skilled in the art for forming diaphragms 104.

The conductor 106 is coupled to the second side 404 of the diaphragm film 400. The conductor 106 is generally formed as an aluminum foil bonded to diaphragm film 400, but may be formed of other conductive material known by those skilled in the art.

The frame 102 includes a base plate 208 surrounded by a wall 210 extending generally orthogonally upward from the plate 208. The wall 210 terminates at a radially extending flange 212 that defines a substantially planar mounting surface 414. A lip 416 extends downwardly from flange 212 in a direction substantially parallel to wall 210. Base plate 208 includes a first surface 418, a second surface 420 and a plurality of apertures 422 extending through the base plate 208. The apertures 422 are positioned and sized to provide air passageways between the first side 402 of diaphragm 104 and first surface 418 of frame 102. An acoustical dampener 236 is mounted to second surface 420 of frame base plate 208.

Figure 6A:
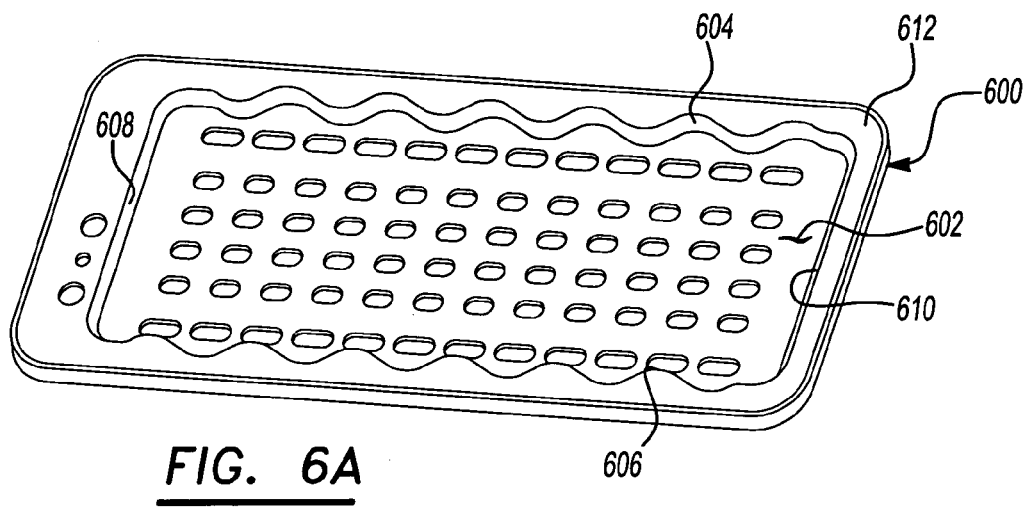
FIG. 6A is a perspective view of a frame having sinusoidal curved sidewalls.
Figure 6B:
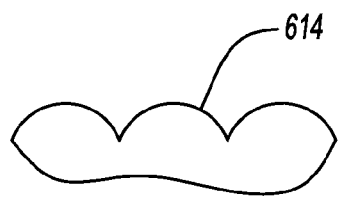
FIG. 6B is a partial plan view of a scalloped sidewall.
Figure 6C:
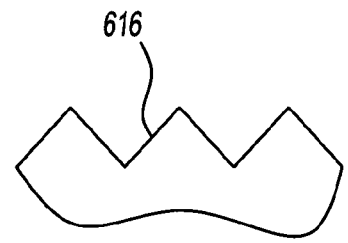
FIG. 6C is a partial plan view of a jagged sidewall.

With reference to FIG. 6, an alternative frame 600 is provided which defines a recessed portion 602 having a pair of sidewalls 604, 606 interconnected by a pair of endwalls 608, 610. As described above, the magnets of the electrodynamic planar loudspeaker are mounted to the frame and a diaphragm is mounted to an upper attachment surface 612. One or more of the sidewalls 604, 606 or end walls 608, 610 includes a plurality of curves along a length of the wall in order to reduce transverse standing waves across the diaphragm. The curved sidewall 604 or 606 can include a sinusoidal curve (FIG. 6A), scallops 614 (FIG. 6B), triangular peaks 616 (FIG. 6C), or any other configuration which reduces standing waves by varying a diameter of the frame along a longitudinal length thereof in order to reduce transverse standing waves across the diaphragm by minimizing the length of parallel wall lengths.

Figure 7:
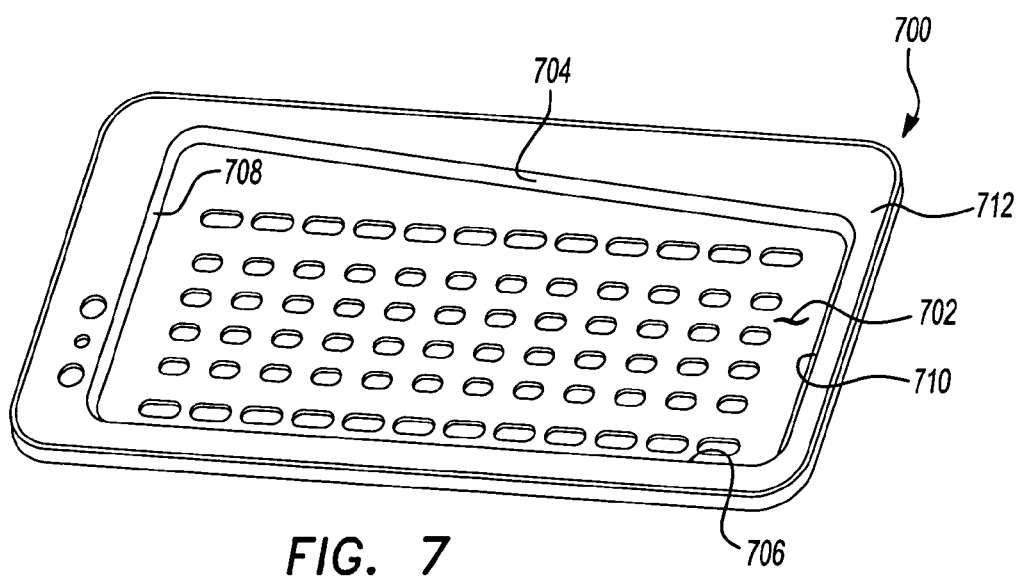
FIG. 7 is a perspective view of a frame having an angled sidewall.

With reference to FIG. 7, a frame 700 according to a second embodiment of the invention, has a recessed portion 702 having a pair of sidewalls 704, 706 connected to one another by a pair of endwalls 708, 710. A plurality of magnets are mounted to the frame 700 and a diaphragm is mounted to an attachment surface 712 of the frame 700. The sidewall 704 is non-parallel to the sidewall 706 in order to reduce transverse standing waves. In particular, sidewall 704 can be angled relative to the sidewall 706. By varying the distance across the frame 700 along a longitudinal length thereof, the production of standing waves is thereby reduced.

With reference to FIG. 8, another embodiment of the invention will now be described. In FIG. 8, an electro-dynamic loudspeaker 800 is provided including a frame 802 having a plurality of magnets 804 (one shown) mounted to the frame 802. A diaphragm 806 is mounted to an attachment surface 808 of the frame 802 by an adhesive 810. The diaphragm includes a conductor including a plurality of elongated traces 812 mounted thereto. A ferrofluid 814 is provided between the diaphragm 806 and magnets 804. The ferrofluid 814 is in contact with the diaphragm 806 so that as the diaphragm 806 vibrates, the contact with the ferrofluid 814 dampens the vibration. As illustrated in FIG. 8A, as the film 806 moves upward, the ferrofluid 814 is "stretched" upward while maintaining contact with the film and as shown in FIG. 8B, as the film 806 moves downward, the ferrofluid 814 is compressed. The ferrofluid 814 is maintained on the surface of the magnet 804 by the magnetic field attracting the ferrous fluid. A wall structure 816 surrounds the magnets 804 in order to isolate the ferrofluid 814 on an upper surface of the magnets 804. The ferrofluid 814 can be provided on all of or selective ones of the magnets 804. In particular, putting ferrofluid only on the outermost magnets 804 may provide sufficient damping. The ferrofluid provides a mechanical dampener for dampening the resonance frequency of the film 806 instead of the use of felt or another dampener material on the back of the frame.

Figure 9:
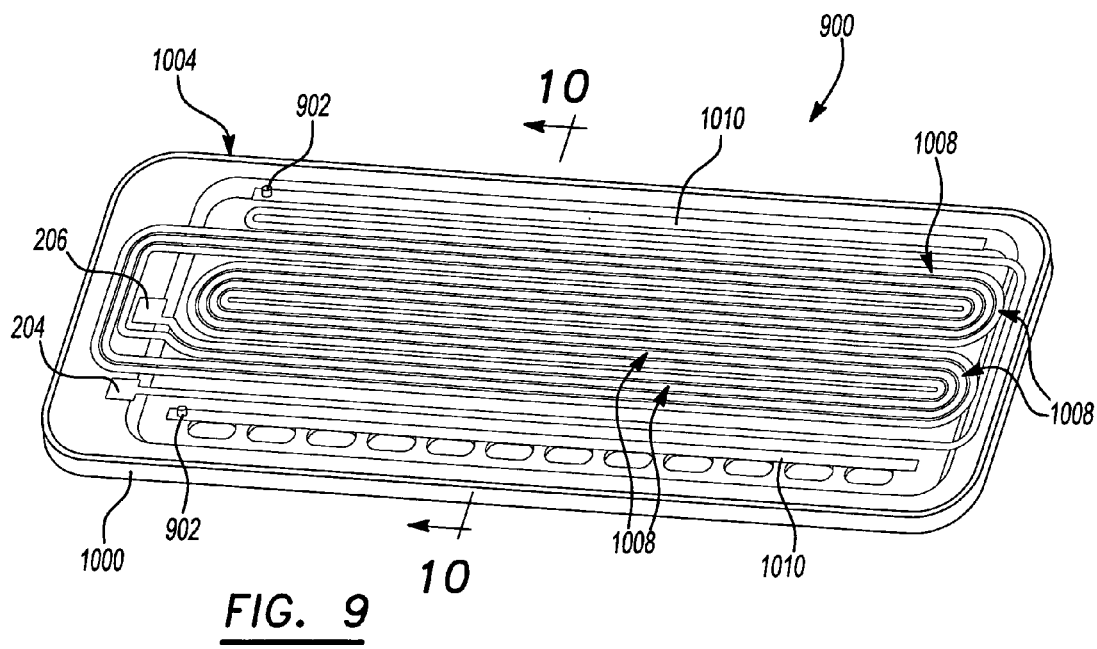
FIG. 9 is a perspective view of an electro-dynamic loudspeaker including an undriven conductor applied to both sides of the film for providing a dampener for the diaphragm film.
Figure 10:
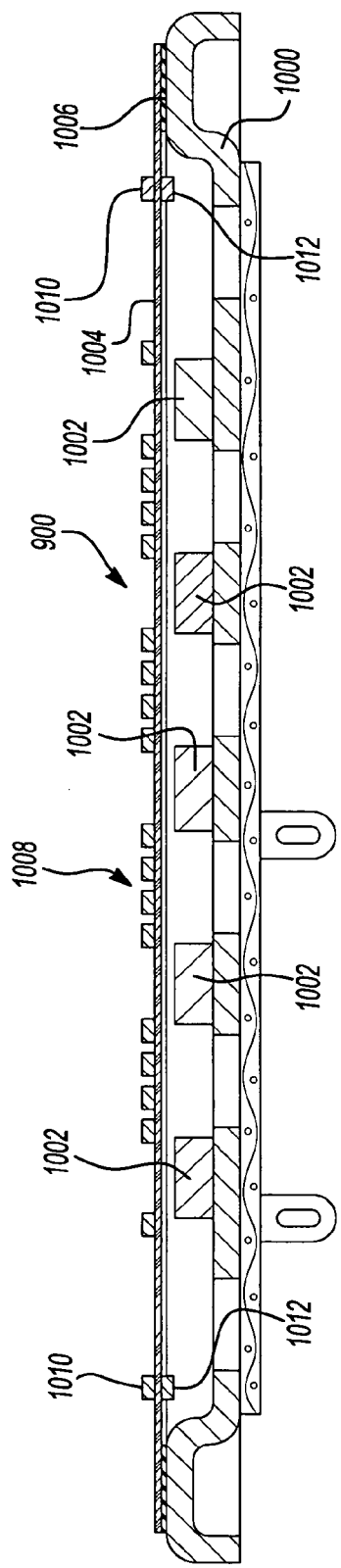
FIG. 10 is a cross-sectional view taken along line 10—10 of FIG. 9.

With reference to FIGS. 9 and 10, an alternative damping arrangement is provided for an electro-dynamic loudspeaker 900. As shown in FIG. 10, the electro-dynamic loudspeaker 900 includes a frame 1000 having a plurality of magnets 1002 mounted thereto as previously described. A film 1004 is mounted to the frame by an adhesive 1006. A conductor 1008 is provided on the film 1004 in the same manner as is described above with reference to FIG. 1. The film 1004 is made from a piezoelectric material such as polyvelydenef-louride (PVDF) that is available under the trade name KYNAR. KYNAR exhibits a piezoelectric effect in that when electricity is applied to conductors attached on opposite sides, the material contracts or expands. A pair of undriven conductors 1010, 1012 (not part of the conductor 1008) are applied to both sides of the film 1004 along opposite edges of the film. The undriven upper and lower conductors 1010, 1012 are each connected together by a rivet 902 extending through the film 1004. The undriven conductor is located in order to dampen the film modes. Specifically, as the film 1004 vibrates, the undriven conductors 1010, 1012 are moved relative to the magnetic field generated by magnets 1002 and generates electric current therethrough which causes the film material to contract and expand as the current changes so that the conductors 1010, 1012 act to dampen film modes and behave like an edged treat. Due to the piezoelectric effect, the PVDF film has a resultant change in thickness based on the relationship $dta = d33*VT$ where: dta is the change in thickness; d33 is the piezoelectric moduli appropriate for the material; and Vt is an applied voltage. Conversely, $Vt = dta/d33$.

Figure 11:
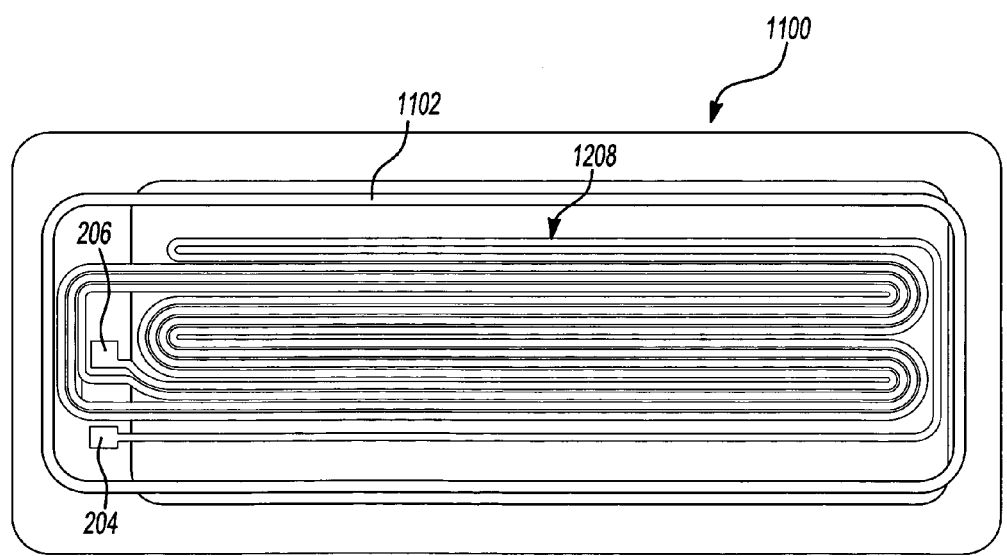
FIG. 11 is a plan view of an electro-dynamic loudspeaker having a shorted turn of conductor in the fringe zone at the edges of the film to electro-dynamically dampen the edge resonance.
Figure 12:
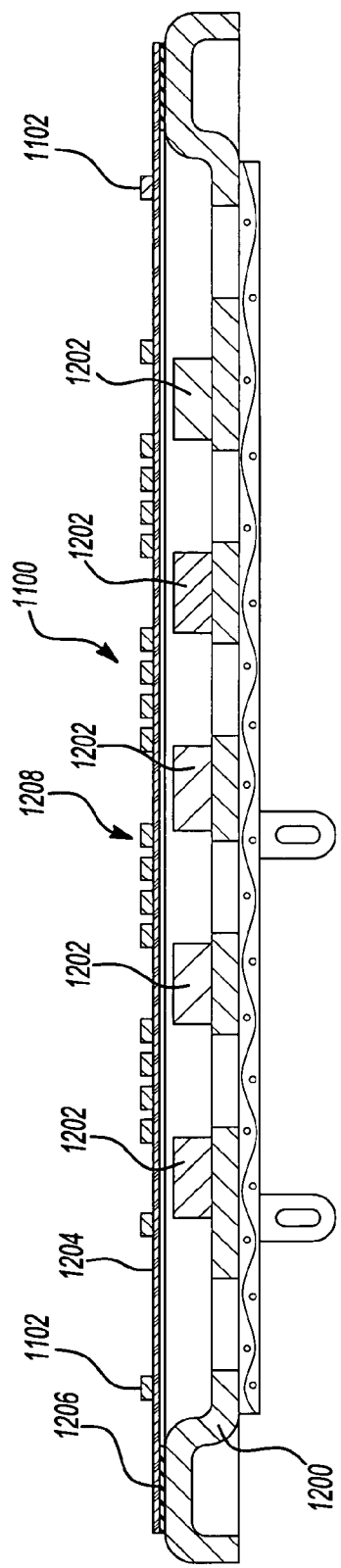
FIG. 12 is a cross-sectional view taken along line 12—12 of FIG. 11.

With reference to FIGS. 11 and 12, an alternative dampening arrangement is provided for an electro-dynamic loudspeaker 1100. The electro-dynamic loudspeaker 1100, as shown in FIG. 12, includes a frame 1200 including a plurality of magnets 1202 mounted thereto. A diaphragm 1204 is mounted to the frame 1200 by an adhesive 1206. A conductor 1208 is mounted to the diaphragm 1204 in the same manner as described with reference to FIG. 1. A shorted turn of conductor 1102 is separately provided in the fringe zone at the edges of the diaphragm 1204, as best illustrated in FIG. 11. The shorted turn 1102 electro-dynamically dampens the edge resonance of the film diaphragm 1204 by providing a damping electromotive force.

While various embodiments of the invention have been described, it will be apparent to those of ordinary skill in the art that other embodiments and implementations are possible that are within the scope of this invention. Accordingly, the invention is not restricted except in light of the attached claims and their equivalents.

What is claimed is:

1. An electro-dynamic loudspeaker, comprising:
   a frame;
   at least one magnet mounted to the frame;
   a diaphragm mounted to the frame, the diaphragm including a conductor mounted to a film material;
   a shorted turn of conductor disposed along a fringe zone at an edge of the diaphragm, the shorted turn of conductor extending exclusively along the fringe zone and entirely around a perimeter of the diaphragm thereby dampening an edge resonance of the diaphragm; and
   a second shorted turn of conductor disposed on an opposite side of the diaphragm from the shorted turn of conductor.

2. An electro-dynamic loudspeaker, comprising:
   a frame;
   at least one magnet mounted to the frame;
   a diaphragm mounted to the frame, the diaphragm including a first conductor for carrying current mounted to a film material, the film material being a piezoelectric material; and
   a second, undriven conductor disposed in a fringe zone along opposite edges of the film material and applied to both sides of the film material, the undriven conductor on one side of the film material connected through the film material to the undriven conductor on the opposite side of the film material thereby dampening an edge resonance of the diaphragm.

3. An electro-dynamic loudspeaker, comprising:
a frame;
at least one magnet mounted to the frame;
a diaphragm mounted to the frame, the diaphragm including a first current-carrying conductor mounted to a film material, the film material being a piezoelectric material; and
a second, undriven conductor means disposed on both sides of the diaphragm and connected through the diaphragm for providing an electric current in a fringe zone along at least two edges of the diaphragm for dampening an edge resonance of the diaphragm.

* * * * *